(12) United States Patent
Bang

(10) Patent No.: US 11,552,282 B2
(45) Date of Patent: Jan. 10, 2023

(54) ROLL PRESS APPARATUS COMPRISING STEPPED REVISION MEMBER AND METHOD FOR PRESSING USING THE SAME

(71) Applicant: LG Chem, Ltd., Seoul (KR)

(72) Inventor: Jong Min Bang, Daejeon (KR)

(73) Assignee: LG Energy Solution, Ltd.

( * ) Notice: Subject to any disclaimer, the term of this patent is extended or adjusted under 35 U.S.C. 154(b) by 437 days.

(21) Appl. No.: 16/761,297

(22) PCT Filed: Oct. 8, 2019

(86) PCT No.: PCT/KR2019/013215
§ 371 (c)(1),
(2) Date: May 4, 2020

(87) PCT Pub. No.: WO2020/085685
PCT Pub. Date: Apr. 30, 2020

(65) Prior Publication Data
US 2021/0151736 A1 May 20, 2021

(30) Foreign Application Priority Data
Oct. 25, 2018 (KR) ........................ 10-2018-0128401

(51) Int. Cl.
*H01M 4/04* (2006.01)
*B30B 3/04* (2006.01)
(Continued)

(52) U.S. Cl.
CPC ........... *H01M 4/0435* (2013.01); *B30B 3/005* (2013.01); *B30B 3/04* (2013.01); *B30B 15/0029* (2013.01);
(Continued)

(58) Field of Classification Search
None
See application file for complete search history.

(56) References Cited

U.S. PATENT DOCUMENTS

2011/0033737 A1 2/2011 Miyahisa et al.
2012/0045689 A1 2/2012 Okabe et al.
(Continued)

FOREIGN PATENT DOCUMENTS

CN 101552335 A 10/2009
CN 102434548 A 5/2012
(Continued)

OTHER PUBLICATIONS

Extended European Search Report including Written Opinion for Application No. EP19874754.5 dated Dec. 18, 2020, pp. 1-5.
(Continued)

*Primary Examiner* — Tracy M Dove
(74) *Attorney, Agent, or Firm* — Lerner, David, Littenberg, Krumholz & Mentlik, LLP

(57) ABSTRACT

According to an exemplary embodiment of the present invention, a roll press apparatus is provided. The roll press apparatus presses electrode sheets, each including a both-side coated portion where an electrode mixture is applied to both sides of a current collector and a one-side coated portion where the electrode mixture is applied to one side of a current collector, by passing the electrode sheet through a separated space between a pair of press rolls.

13 Claims, 5 Drawing Sheets

(51) Int. Cl.
    *B30B 15/00*  (2006.01)
    *B30B 3/00*  (2006.01)
    *H01M 10/0587*  (2010.01)
(52) U.S. Cl.
    CPC ..... *H01M 4/0404* (2013.01); *H01M 10/0587* (2013.01)

(56) References Cited

U.S. PATENT DOCUMENTS

2013/0326865 A1    12/2013    Kobayashi et al.
2018/0226630 A1     8/2018    Yanai et al.
2018/0301688 A1    10/2018    Kobayashi et al.

FOREIGN PATENT DOCUMENTS

| CN | 202392752 U | 8/2012 |
|----|-------------|--------|
| JP | 2002237298 A | 8/2002 |
| JP | 2010170810 A | 8/2010 |
| JP | 2012069266 A | 4/2012 |
| JP | 2014103068 A | 6/2014 |
| JP | 5596183 B2 | 9/2014 |
| JP | 2016181345 A | 10/2016 |
| JP | 2017224568 A | 12/2017 |
| KR | 20070097148 A | 10/2007 |
| KR | 20120076850 A | 7/2012 |
| KR | 20150051046 A | 5/2015 |
| KR | 20180081310 A | 7/2018 |

OTHER PUBLICATIONS

International Seach Report for Application No. PCT/KR2019/013215 dated Feb. 3, 2020, 2 pages.
Search Report dated Sep. 14, 2022 from the Office Action for Chinese Application No. 201980004747.5 dated Sep. 27, 2022, 2 pages [See p. 1, categorizing the cited references].

ROLL PRESS APPARATUS COMPRISING STEPPED REVISION MEMBER AND METHOD FOR PRESSING USING THE SAME

CROSS-REFERENCE TO RELATED APPLICATION(S)

The present application is a national phase entry under 35 U.S.C. § 371 of International Application No. PCT/KR2019/013215, filed on Oct. 8, 2019, which claims priority from Korean Patent Application No. 10-2018-0128401 filed on Oct. 25, 2018, the entire contents of which are incorporated herein by reference.

TECHNICAL FIELD

The present invention relates to a roll press apparatus including a stepped revision member, and a roll-pressing method using the same.

BACKGROUND ART

As the development and demand for mobile devices increases, the demand for rechargeable batteries as an energy source is increasing rapidly, and among the rechargeable batteries, many researches have been conducted on commercially available lithium rechargeable batteries with high energy density and discharge voltage, and lithium rechargeable batteries have been widely used.

Rechargeable batteries are classified into cylindrical batteries and rectangular batteries in which the electrode assembly is embedded in a cylindrical or rectangular metal can, and pouch batteries in which the electrode assembly is embedded in a pouch type of case made of an aluminum laminate sheet according to the shape of the battery case.

In addition, as a generator that is formed in a laminated structure of a positive electrode/a separator/a negative electrode and can be repeatedly charged and discharged, the electrode assembly is embedded in the battery case, and may be approximately classified into a spiral-wound jelly-roll type with a separation film between a long sheet type anode and a negative electrode coated with an active material, a stack type in which a plurality of positive and negative electrodes are sequentially stacked while disposing a separator therebetween, and a stack/fold type in which stacked unit cells are wound with a long length of a separation film. Among them, the jelly-roll type of electrode assembly has high merits of easy manufacturing and high energy density per unit weight. Such a jelly-roll type of electrode assembly has been mainly used in a cylindrical type of battery and a prism-shaped battery.

FIG. 1 is a cross-sectional view of an electrode sheet included in a conventional jelly-roll type electrode assembly. Hereinafter, this will be described in further detail.

Referring to FIG. 1, an electrode sheet is formed by coating an active material on opposite sides of an electrode current collector 10 to increase an opposing area of each electrode. Due to the nature of the jelly-roll structure, a portion in which inner and outer surfaces 12 and 14 of the two electrodes overlap each other do not face each other. That is, in the first winding portion of the inner side of which the first winding of the inner electrode is wound and in the winding section of the outer side of the outer electrode which are wound last, the opposing surfaces of the two electrodes are not formed. Thus, in these portions, active material layers 20 and 30 are applied only to the sides of the electrodes facing each other. Hereinafter, the portions where the active material is applied only to a single side of each electrode will be called one-side coated portions 40.

Meanwhile, a portion where the active material is not coated and thus a current collector metal film is exposed may be called an uncoated portion, but the uncoated portion is not limited to the non-facing portion. An electrode tab 50, which serves as a path for drawing out charges moved through the electrode current collector 10 to the outside the battery cell is welded to the uncoated portion, and a mandrel that grips an electrode when the jelly-roll type electrode assembly is spirally wound also becomes an uncoated portion.

However, since the one-side uncoated portion 40 is coated with an active material only at one side, uniformity of rolling is not maintained in relation to a two-side coating portion in which active material is applied on both sides of the current collector, and the one-side coated portion 40 and the both-side coating portion have a difference of about 10% even in the porosity of the electrode in the rolling step to increase density of the electrode active material layer after applying the active material.

For this reason, when a lithium rechargeable battery is completed and is thus charged and discharged, electrochemical reactions and battery phenomena tend to be excessive or underestimated in such non-uniform portions, in comparison with other portions, and accordingly, problems such as deteriorated electrical function, battery failure, and shortened cycle-life may occur. In addition, process defects may occur due to the non-uniformity of these portions even in manufacturing the battery.

For example, a low pressure is applied to the one-side coated portion due to a thin thickness in a rolling and pressing process for electrode manufacturing, and a coated active material is combined with the electrode assembly with low pressure and low density. Thus, when the volume is changed by charging, a pressure difference with the two-side coated portion becomes more severe, which may cause a problem that a cycle-life characteristic due to deformation of the electrode assembly and the resulting battery swelling phenomenon is rapidly deteriorated.

Therefore, there is a high need for an electrode rolling process of a jelly-roll type electrode assembly which can solve the above problems.

DISCLOSURE

Technical Problem

The present invention aims to solve such problems of the conventional art and technical objects that have been requested from the past.

In detail, the present invention provides a roll press apparatus including a stepped revision member having a thickness that corresponds to a step difference between a one-side coated portion where an electrode mixture is applied to only one side of a current collector and a both-side coated portion where the electrode mixture is applied to both sides of the current collector, to thereby solve a press-rolling problem due to the step difference.

Technical Solution

According to an exemplary embodiment of the present invention, a roll press apparatus that presses electrode sheets, each including a both-side coated portion where an electrode assembly is applied to both sides of a current collector, and a one-side coated portion where the electrode mixture is applied to one side of a current collector, by passing the electrode sheets through a separated space between a pair of press rolls, is provided.

The press roll includes an upper roll and a lower roll, and the upper roll or the lower roll include a stepped revision member that assigns a step in a thickness of the press roll with a thickness that corresponds to a step difference between the both-side coated portion and the one-side coated portion.

In addition, according to another exemplary embodiment of the present invention, a press-rolling method for press-rolling an electrode sheet by using the roll press apparatus is provided.

The press-rolling method includes:

(a) preparing electrode sheets, each including a both-side coated portion and one-side coated portion by applying an electrode slurry that includes an electrode active material, a binder, and a conductive material, to one side and both sides of a current collector, and drying the coated electrode slurry;

(b) preparing a roll press apparatus by coupling a stepped revision member to an upper roll or a lower roll so as to correspond to a thickness corresponding to a step difference between the both-side coated portion and the one-side coated portion; and (c) press-rolling the electrode sheets by inserting the same into the roll press apparatus such that the stepped revision member formed in the upper roll or the lower roll presses the other side of the one-side coated portion, which is an uncoated side.

MODE FOR INVENTION

Figure 1:
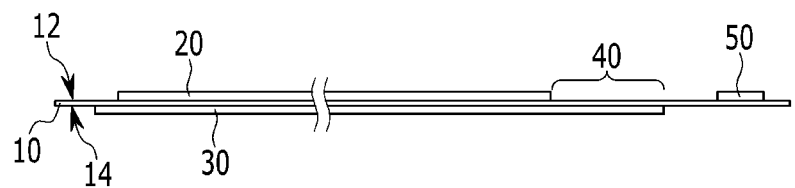
FIG. 1 is a cross-sectional view of an electrode sheet included in a conventional electrode assembly.

Hereinafter, the present invention will be described in more detail to aid in understanding the present invention.

Terms or words used in the specification and claims should not be limited and construed as common or dictionary meanings, and should be construed as meanings and concepts according to the technical spirit of the present invention based on the principle that the inventor can appropriately define the concept of each term for describing the invention in the best way.

The terms used in the present specification are only for illustrating exemplary embodiments, and are not intended to limit the present invention. An expression of a singular form includes an expression of plural forms, unless the context clearly indicates otherwise.

In the present specification, the term, "comprise", "include", or "have" should be understood as specifying the presence of practiced features, steps, constitutional elements, or a combination thereof, but not precluding the possibility of presence or addition of one or more of other features, steps, constitutional elements, or a combination thereof.

According to an exemplary embodiment of the present invention, a roll press apparatus is provided. The roll press apparatus presses electrode sheets, each including a both-side coated portion where an electrode mixture is applied to both sides of a current collector and a one-side coated portion where the electrode mixture is applied to one side of a current collector, by passing the electrode sheet through a separated space between a pair of press rolls.

The roll press apparatus includes an upper roll and a lower roll, wherein the upper roll or the lower roll includes a stepped revision member that provides a step in a thickness of the press roll with a thickness corresponding to a step between the both-side coated portion and the one-side coated portion.

The electrode sheet includes a both-side coated portion and a one-side coated portion, which are applied with an electrode mixture, and thus a portion where the electrode mixture is not applied may be called an uncoated portion.

In this case, the other side of the one-side coated portion, not applied with the electrode mixture, may also be called an uncoated portion. Accordingly, only one side of the current collector is an uncoated portion in the one-side coated portion.

In addition, the both-side coated portion and the one-side coated portion are formed adjacent to each other in a length direction or a coating direction of the current collector, and an uncoated portion where an electrode tab is to be attached is included in one surface or opposite surfaces of the current collector in the length direction or the coating direction. In this case, the portion where the electrode tab is attached may be both sides of the current collector. That is, both sides of the current collector may be uncoated portions.

Meanwhile, according to the present invention, the other side of the one-side coated portion is not applied with the electrode mixture, and thus, compared to the both-side coated portion where the electrode mixture is applied to both sides of the current collector, a thickness of an electrode is as small as a thickness of the electrode mixture applied to the other side of the both-side coated portion. Such a thickness difference is called a step difference between the both-side coated portion and the one-side coated portion.

Such a step difference does not allow proper press-rolling of the one-side coated portion in a press-rolling process in which press-rolling is performed by upper and lower rolls spaced at regular intervals, and thus only a relatively small pressure is applied compared to the pressure applied to the both-side coated portion. Accordingly, when a rechargeable battery is manufactured comprising the electrode prepared as above, the pressure difference with the both-side coated portion becomes more severe due to the volume change caused by the charging, and thus deformation of the electrode assembly and a difference in porosity may occur, thereby causing acceleration of electrolyte solution consumption and sudden deterioration of the cycle-life characteristics.

Thus, in order to proceed with the rolling of the one-side coated portion differently from the two-side coating portion, there have been attempts to reduce the rolling speed or change the order of the electrode sheet input. However, in this case, the improvement effect was only about 1 to 2%, and the difference in porosity was still at least 6%.

Accordingly, the inventors of the present invention determined that when reducing the space between the upper roll and the lower roll by as much as a thickness that corresponds to the step difference, almost the same degree of rolling pressure can be applied in the press-rolling of one side coating portion, and accordingly the difference in porosity can be minimized. However, for this purpose, when adjusting the position of the press roll, not only is an additional process required, but also a problem that deformation of the current collector may occur due to the movement of the roll, thus the problems were solved by reducing the gap by as much as the corresponding step without changing the position of the roll.

This can be achieved by including a stepped revision portion that assigns a step in a thickness of the press roll with a thickness corresponding to the step difference between the both-side coated portion and the one-side coated portion.

Here, the "thickness of the press roll" implies a distance from a center of a roll, such as the radius of the press roll to the surface of the roll. Thus, the expression, "a step is assigned to a thickness of the press roll" implies that since the stepped revision member is coupled to the press roll, a thickness of the press roll is increased in a certain portion, that is, the radius of the press roll is increased in a certain portion, such that a step difference with a portion where the stepped revision member is not coupled occurs.

In addition, the stepped revision member may have a width that is the same as or larger than a width of the press roll and may have the length as the one-side coated portion in a press-roll direction to provide the step difference so that the stepped revision member can press-roll only the one-side coated portion in which the electrode mixture is applied only on one side of the current collector.

Here, the width implies a distance of the press roll in an axis direction, and the length implies a distance of the one-side coated portion in the press-roll direction.

With such a structure, the one-side coated portion and the both-side coated portion may be applied with the same press-roll pressure by reducing the space between the upper roll and the lower roll by as much as the step difference between the both-side coated portion and the one-side coated portion.

The stepped revision member may have a structure that is detachable from the press roll.

When the stepped revision member has such a structure, only the one-side coated portion may be press-rolled in a state in which the stepped revision member is coupled to the press roll, and then detached for execution of press-rolling, and accordingly, the roll press apparatus according to the present invention can be used without regard to a length of the electrode sheet.

Here, the method for attaching and detecting the stepped revision member is not limited and thus any structures and methods are applicable, for example a mechanical coupling method using a fastening groove or a fastener corresponding to the fastener or the fastening groove may be used.

In addition, the stepped revision member may have a structure in which the stepped revision member can be moved and fixed along the surface of the press roll while being coupled to the press roll such that the stepped revision member can press the one-side coated portion without regard to a position of the one-side coated portion.

As described, the stepped revision member can be moved to press only a coated portion regardless of the position of the position of the one-side coated portion, so it is excellent in terms of process cost and efficiency as it can be applied to various types of electrode sheets with simple operation.

Such a method for moving and fixing the stepped revision member is not limited, but, for example, the stepped revision member may move while the stepped revision member is first-stage coupled to the upper roll and then is fixed while being second-stage coupled to the upper.

Here, the one-step coupling is a form in which the stepped revision member and the press roll are mechanically fastened in the form of male and female, but the stepped revision member is coupled with a bonding force such that the stepped revision member does not fall out of the press roll, and two-stage coupling is a form that is more tightly coupled so that the stepped revision member cannot move along the surface of the press roll.

For example, the stepped revision member has a protrusion-shaped fastener and a recess-shaped fastening groove, and when the press roll has a fastening groove or a fastener that corresponds to the fastener or the fastening groove of the stepped revision member, the fastener may be shallowly inserted into the fastening groove through the first-stage coupling and deeply inserted to the fastening groove through the second-stage coupling such that the stepped revision member can be moved and fixed.

In this case, the fixing of the coupling state is not limited and may be carried out by various methods, and for example, a material having elastic force and friction force may be formed in the fastening groove and the fastener, or the protrusion may be formed in the fastening groove and the fastener.

Meanwhile, the stepped revision member may be formed of a single body or two or more auxiliary members, and the auxiliary members may be coupled with each other or separated from each other.

As described, when the stepped revision member may be formed of two or more auxiliary members, which can be coupled and separated from each other, it is efficient in terms of process because two or more auxiliary members that can be combined and separated by a thickness corresponding to a step difference can be applied to different types of electrode sheets having different steps of one-side coated portion and both-side coated portion.

A method for coupling and separating the two or more auxiliary members is not limited, but mechanical coupling using the fastening groove and the fastener may be used.

On the other hand, the upper roll and the lower roll of the press roll apparatus may be positioned up and down at positions spaced apart from each other by a narrower width than the thickness of the both-side coated portion of the electrode sheet so that the electrode sheet can be press-rolled while passing therethrough.

In addition, the press roll apparatus may further include a thickness adjusting portion, a space adjusting portion, an automatic execution portion, a unique character recognition portion, a transfer roll, and a spiral-wound roll in addition to the press roll and the stepped revision member.

Specific configurations of this structure are known in the art, and thus description thereof is omitted.

Further, a position adjusting portion of the stepped revision member may be further included for automation of movement of the stepped revision member in a surface of the press roll. In this case, the position adjusting portion may operate as a mechanism that is similar to that of a thickness adjusting portion and a separated space adjusting portion.

According to another exemplary embodiment of the present invention, a press-rolling method for press-rolling an electrode sheet by using the roll press apparatus is provided.

The press-rolling method includes:

(a) preparing electrode sheets, each including a both-side coated portion and one-side coated portion by applying an electrode slurry that includes an electrode active material, a binder, and a conductive material, to one side and both sides of a current collector, and drying the coated electrode slurry;

(b) preparing a roll press apparatus by coupling a stepped revision member to an upper roll or a lower roll so as to correspond to a thickness corresponding to a step difference between the both-side coated portion and the one-side coated portion; and (c) press-rolling the electrode sheets by inserting the same into the roll press apparatus such that the stepped revision member formed in the upper roll or the lower roll presses the other side of the one-side coated portion, which is an uncoated side.

According to such a press-rolling method, the stepped revision member provides a thickness that corresponds to a step difference between the both-side coated portion and the one-side coated portion such that the press rolling can be carried out while minimizing a pressure difference such that the pressure applied to the both-side coated portion and the pressure applied to the one-side coated portion may be almost the same as each other, thereby solving problems of electrode deformation and cycle-life characteristic deterioration due to the significant difference in conventional porosity.

In this case, since the stepped revision member should be coupled to a position corresponding to the one-side coated portion and only one side of the coating portion should be pressed, it is preferable to press the one-side coated portion with the stepped revision member, and then the stepped revision member is detached from the press roll.

Therefore, the stepped revision member is coupled to the press roll to press-roll the one-side coated portion of the electrode sheet at the start of press-rolling, and the electrode sheets may be inserted into spaces between the press rolls so that the stepped revision member contacts from the one-side coated portion to a side where the electrode mixture is not coated, that is, the other side of the one-side coated portion.

As described when the press-rolling starts from the one-side coated portion, the stepped revision member can be detached after the press-rolling of the one-side coated portion is finished, and accordingly the press-rolling can be carried out with the same pressure without regard to a length of the both-side coated portion.

Accordingly, the stepped revision member may be removed after the one-side coated portion is pressed.

Meanwhile, the stepped revision member may have a structure in which the stepped revision member is formed of a single body or includes two or more auxiliary members such that the stepped revision member is applicable without regard to the size of the step difference between the both-side coated portion and the one-side coated portion.

For more detailed description of the present invention, the roll-press apparatus and press-rolling of the electrode sheet by using the roll press apparatus are schematically illustrated in FIG. 2 to FIG. 5.

Figure 2:
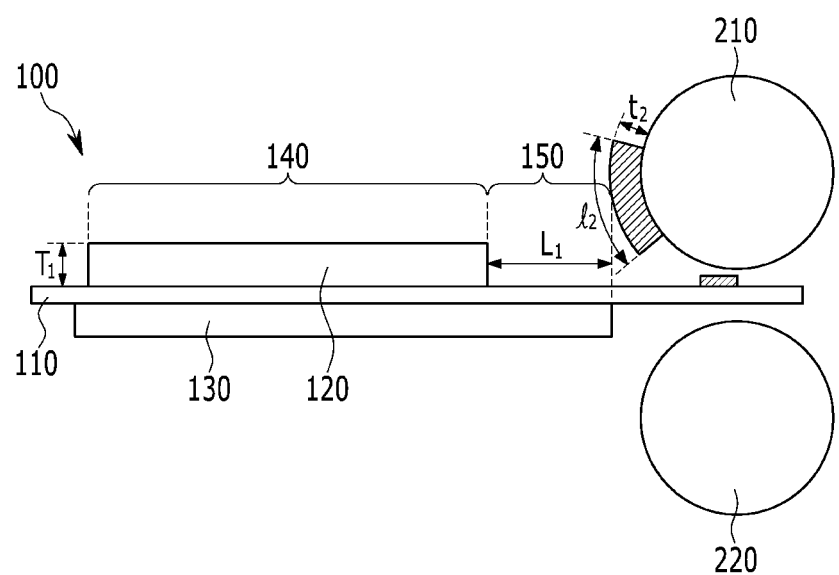
FIG. 2 is a schematic cross-sectional view of an example of press-rolling an electrode sheet by using a roll press apparatus according to an exemplary embodiment of the present invention.

Referring to FIG. 2, an electrode sheet 100 includes a both-side coated portion 140 where electrode mixtures 120 and 130 are applied to both sides of a current collector 110, and a one-side coated portion 150 where the electrode mixture 140 is applied to one side of the current collector 110.

A roll press apparatus that presses such an electrode sheet 100 includes an upper roll 210 that is disposed above and a lower roll 220 that is disposed below with reference to a separated space where the electrode sheet 100 is inserted, and has a structure in which a stepped revision member 230 having a thickness $t_2$ that corresponds to a thickness $T_1$ corresponding to a step difference between the both-side coated portion and the one-side coated portion is coupled to the upper roll 210.

In this case, the other side of the one-side coated portion 150 is not applied with the electrode mixture 120, and thus compared to the both-side coated region 140 where the electrode mixtures 120 and 130 are applied to both sides of the current collector 110, a thickness of the one-side coated portion 150 is as small as a thickness of the electrode assembly 120 applied to the other side of the both-side coated portion 140. Such a thickness difference $T_1$ is called a step difference between the both-side coated portion 140 and the one-side coated portion 150.

The electrode sheet 100 is inserted into a separated space formed of the upper roll 210 to which the stepped revision member 230 is coupled, and the lower roll 220, and in this case, the electrode sheet 100 is inserted and thus the stepped revision member 230 presses the un-coated side of the one-side coated portion 150. After the one-side coated portion 150 is pressed, the stepped revision member 230 is removed, and then the one-side coated portion 150 of the electrode sheet 100 is inserted into the roll press apparatus so as to not affect a subsequent process.

Such a roll press apparatus will be described in detail with reference to FIG. 3 to FIG. 5.

Figure 3:
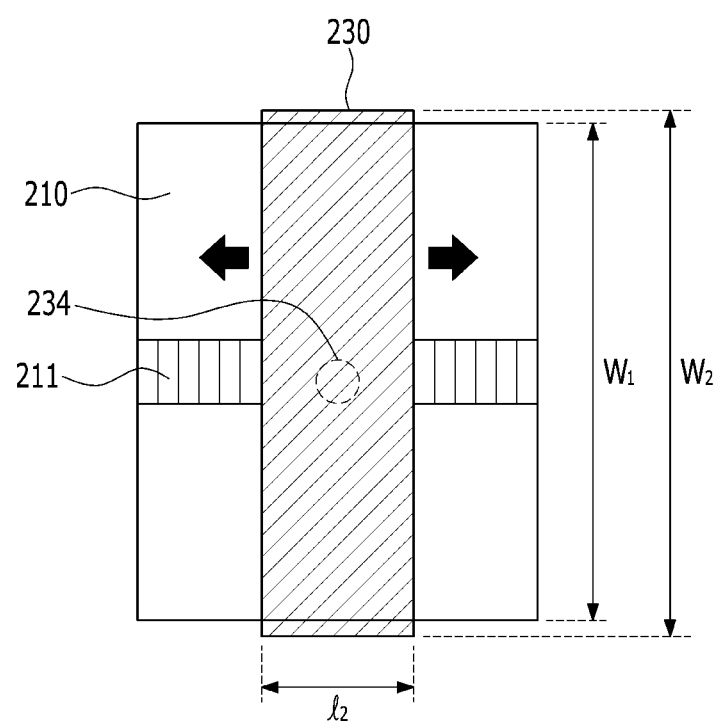
FIG. 3 is a top plan view of the upper roll to which the stepped revision member is coupled according to the exemplary embodiment of the present invention.

FIG. 3 is a top plan view of the upper roll 210 to which the stepped revision member 230 is coupled, viewed from above. In this case, to examine a coupling shape of the stepped revision member 230, a top view of the shape where the stepped revision member 230 is located in the middle of the upper roll 210 is provided.

Referring to FIG. 3, together with FIG. 2, the stepped revision member 230 may have a width $W_2$ that is equal to or larger than the width $W_1$ of the upper roll 210 such that the electrode mixture may press only the one-side coated portion 150 in which only one side of a current collector is applied with an electrode mixture, and has a length 12 that is a length Li of the one-side coated portion 150 in a press-rolling direction.

In addition, the stepped revision member 230 may have a structure of being detachable from the upper roll 210 so as to press and remove the one-side coated portion 150 of the electrode sheet 100.

Figure 4:
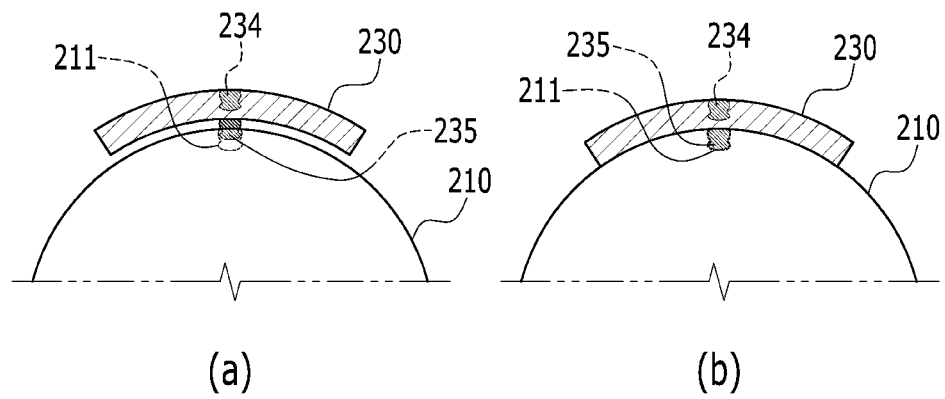
FIG. 4 is a side view that exemplarily illustrates a coupling state of the stepped revision member to the upper roll of the roll press apparatus according to the exemplary embodiment of the present invention.

A method of attaching and detaching the stepped revision member 230 to the upper roll 210 is not limited as long as it is a structure and method that can be combined and detached, and for example, as shown in FIG. 4, mechanical fastening of male and female couplings may be used In FIG. 4, a side view for exemplarily illustrating a coupling state of the stepped revision member 230 to the upper roll 210 is provided.

Referring to FIG. 4, together with FIG. 2 and FIG. 3, the stepped revision member 230 includes a fastener 235, and the upper roll 210 includes a fastening groove 211 corresponding to the fastener 235 of the stepped revision member 230 such that they can be mechanically coupled. The opposite is also applicable.

In addition, without regard to a position where the one-side coated portion 150 is formed, the stepped revision member 230 has a structure that can be movable and fixable along a surface of the upper roll 210 while being coupled to the upper roll 210 such that the stepped revision member 230 can press the one-side coated portion 150. Thus, the fastening groove 211 is formed in the surface of the upper roll 210 along a length direction of the surface such that the stepped revision member 230 can be moved and fixed.

In this case, a method for moving and fixing the stepped revision member 230 is not limited, but, referring to FIG. 4, for example, the stepped revision member 230 moves while the stepped revision member 230 is first-stage coupled to the upper roll 210 (i.e., (a) in FIG. 4), and is fixed while being second-stage coupled to the upper roll 210 (i.e., (b) in FIG. 4).

Meanwhile, as shown in FIG. 4, the stepped revision member 230 may be provided as a single body, but may be formed or two or more auxiliary members to differentiate a thickness thereof corresponding to a step difference between the both-side coated portion 140 and the one-side coated portion 150.

Figure 5:
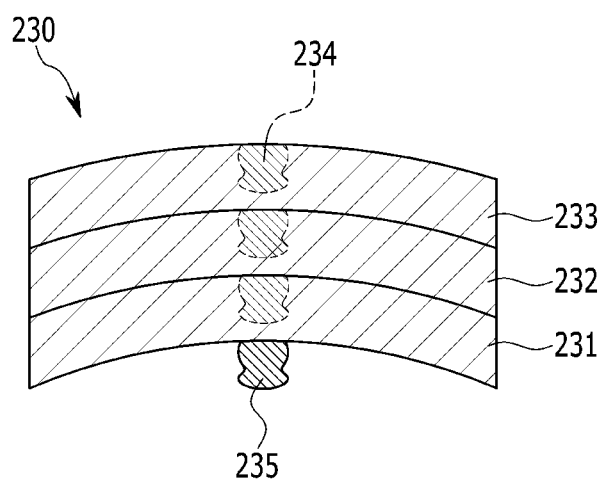
FIG. 5 is a cross-sectional view of a stepped revision member according to the exemplary embodiment of the present invention.

FIG. 5 is a cross-sectional view of the stepped revision member 230 formed of two or more auxiliary members 231, 232, and 233 for description of such a structure.

Referring to FIG. 5, together with FIG. 3, the auxiliary members 231, 232, and 233 may be coupled with each other or separated from each other, and a method for coupling and separating the two or more auxiliary members 231, 232, and 233 is not limited, but a mechanical coupling method using the fastening groove and the fastener as described with reference to FIG. 4 may be used. Thus, the auxiliary members 231, 232, and 233 respectively include fastening grooves 234 that are disposed in upper portions thereof and are thus coupled with the fastener 235 of the auxiliary members, and fasteners 235 that are disposed in lower portions thereof and are thus coupled with the fastening grooves 234 of the auxiliary member.

Thus, referring to FIG. 4 and FIG. 5, the stepped revision member 230 can be coupled with each other since they include fasteners and fastening grooves with regard to the number of auxiliary members, and may also be coupled with the upper roll 210

The above-stated coupling method is only one example, and any structure that can be detachable is included in the scope of the present invention.

Those of ordinary skill in the field of the present invention will be able to make various applications and modifications within the scope of the present invention based on the contents.

INDUSTRIAL APPLICABILITY

As described above, the roll press apparatus according to the present invention includes the stepped revision member having a thickness that corresponds to the step difference between the one-side coated portion where the electrode mixture is applied to only one side of the current collector and the both-side coated portion where the electrode mixture is applied to both sides of the current collector, such that the one-side coated portion can also be pressed with an equivalent pressure, thereby securing uniform porosity as a whole, to reduce the possibility of failure and to improve the life characteristics by a uniform reaction in the finished rechargeable battery.

In addition, the stepped revision member can be detachably attached to the roll press apparatus, and can be applied to various electrode sheets by changing the thickness of the stepped revision member according to the thickness difference between the one-side coated portion and the both-side coated portion, so that it is excellent in terms of process cost and efficiency.

The invention claimed is:

1. A roll press apparatus configured to press electrode sheets each including a both-side coated portion where an electrode mixture is disposed on both sides of a current collector and a one-side coated portion where the electrode mixture is disposed on one side of a current collector,
   comprising a press roll including an upper roll and a lower roll,
   wherein the press roll is configured to press the electrode mixture when the electrode sheets are passed through a separated space between the upper roll and the lower roll, and
   the upper roll or the lower roll comprises a stepped revision member that is configured to assigns a step in a thickness of the press roll with a thickness that corresponds to a step difference between the both-side coated portion and the one-side coated portion.

2. The roll press apparatus of claim 1, wherein the stepped revision member has a width that is the same as or larger than a width of the press roll.

3. The roll press apparatus of claim 1, wherein the stepped revision member has a length that is the same as a length of the one-side coated portion in a length of a press direction.

4. The roll press apparatus of claim 1, wherein the stepped revision member has a structure that is detachable from the press roll.

5. The roll press apparatus of claim 4, wherein the stepped revision member comprises a fastener or a fastening groove, and the press roll comprises a fastening groove or a fastener corresponding to the fastener or the fastening groove.

6. The roll press apparatus of claim 1, wherein the stepped revision member has a structure that is movable and fixable along a surface of the press roll while being coupled to the press roll.

7. The roll press apparatus of claim 6, wherein the stepped revision member comprises a fastener or a fastening groove, and the press roll comprises a fastening groove or a fastener corresponding to the fastener or the fastening groove of the stepped revision member, and the fastener and the fastening groove have a structure configured to provide first-stage coupling for fastening the fastener in the fastening groove by slight insertion and a second-stage coupling for fastening the fastener to the fastening groove by deep insertion.

8. The roll press apparatus of claim 1, wherein the stepped revision member comprises two or more auxiliary members, and the auxiliary members are coupled with each other or separated from each other.

9. The roll press apparatus of claim 1, wherein the roll press apparatus further comprises a thickness adjusting portion, a separated space adjusting portion, an automatic execution portion, a unique character recognition portion, a transfer roll, and a spiral-winding roll.

10. A press-rolling method off press-rolling an electrode sheet by using the roll press apparatus according to claim 1, including:
   (a) preparing the electrode sheets, each including the both-side coated portion and the one-side coated portion by applying an electrode slurry that includes an electrode active material, a binder, and a conductive material, to one side and both sides of a current collector, and drying the coated electrode slurry;
   (b) preparing the roll press apparatus by coupling the stepped revision member to the upper roll or the lower roll so as to correspond to the thickness corresponding to the step difference between the both-side coated portion and the one-side coated portion; and (c) press-rolling the electrode sheets by inserting the same into the roll press apparatus such that the stepped revision member formed in the upper roll or the lower roll presses an other side of the one-side coated portion, which is an uncoated side.

11. The press-rolling method of claim 10, wherein the stepped revision member is coupled to a press roll to press the one-side coated portion of the electrode sheets at the start of rolling, and the electrode sheets are inserted from the one-side coated portion into the separated space between the upper and lower press rolls.

12. The press-rolling method of claim 10, wherein the stepped revision member is formed of a single body, or includes two or more auxiliary members.

13. The press-rolling method of claim 10, wherein the stepped revision member is removed after the one-side coated portion is pressed.

* * * * *